United States Patent [19]

Spalding

[11] 4,022,304
[45] May 10, 1977

[54] TREAD BRAKE ASSEMBLY

[75] Inventor: Willard P. Spalding, Penn Hills, Pa.

[73] Assignee: Westinghouse Air Brake Company, Wilmerding, Pa.

[22] Filed: Aug. 2, 1976

[21] Appl. No.: 710,464

[52] U.S. Cl. .......................... 188/203; 188/153 R; 188/196 D

[51] Int. Cl.² ........................................ F16D 65/56

[58] Field of Search ............ 188/52, 153 R, 196 A, 188/196 D, 196 BA, 202, 203

[56] References Cited

UNITED STATES PATENTS

| | | | |
|---|---|---|---|
| 2,940,553 | 6/1960 | Newell et al. | 188/153 R |
| 3,416,635 | 12/1968 | Salton | 188/196 BA |
| 3,690,421 | 9/1972 | Frania et al. | 188/203 |
| 3,837,443 | 9/1974 | Clemmons et al. | 188/196 A |

*Primary Examiner*—Duane. A. Reger
*Attorney, Agent, or Firm*—W. F. Poore; R. W. McIntire, Jr.

[57] ABSTRACT

This invention relates to a pneumatically-applied spring-released brake assembly for each individual wheel of a railway vehicle truck, wherein the brake assembly comprises a pair of levers that so cooperate with non-self-locking threads formed on a nut and a screw member as to provide a high mechanical advantage or multiplication of the braking force transmitted from a piston to a brake shoe thereby enabling a substantial reduction in the diameter of the piston and therefore of the size of the brake assembly from that of such assemblies heretofore necessary to transmit the same braking force to the shoe.

31 Claims, 4 Drawing Figures

TREAD BRAKE ASSEMBLY

BACKGROUND OF THE INVENTION

In several heretofore commercially used pneumatically-applied spring-released brake assemblies or units, the piston rod is operatively connected to one end of a lever pivotally mounted intermediate its ends, and one end of a brake rod, that has a brake-hanger supported brake-shoe-carrying brake head pivoted to the other end, is operatively connected to the other end of this lever. One such brake unit is shown and described in U.S. Pat. No. 2,940,553, issued June 14, 1960, to George K. Newell et al, and assigned to the assignee of the present application. Brake assemblies, such as that disclosed in the above-mentioned Newell et al patent, are used to a considerable extent on railway passenger cars and in actual practice may have an overall height of as much as twenty inches or more. This type of brake assembly or unit cannot conveniently be employed on some of the newer types of light-weight railway and rapid transit passenger cars due to limitations of space provided by conventional mounting arrangements. Moreover, the tread brake unit disclosed in the patent to Newell et al is not provided with a so-called "snow brake" wherein the brake shoe is constantly pressed against the tread surface of a corresponding wheel with sufficient force whereby the heat generated thereby prevents the accumulation of snow and ice which would, as the result of freezing thereon, render this brake unit inoperative.

U.S. Pat. No. 3,837,443 issued Sept. 24, 1974 to Quentin T. Clemmons et al and assigned to the assignee of the present application, discloses a hydro-pneumatic brake unit that includes a so-called "snow brake" wherein the brake shoe is constantly pressed against the tread surface of a corresponding wheel to prevent the accumulation of ice and snow. In actual practice, a hydro-pneumatic brake unit constructed in accordance with the teachings of the Clemmons et al patent likewise has an overall height of approximately twenty inches or more. Consequently, this type of brake unit cannot conveniently be employed on some of the newer types of light-weight railway and rapid transit passenger cars due to limitations of space provided by conventional mounting arrangements.

Accordingly, it is the general purpose of this invention to provide a small, light-weight, compact pneumatic tread brake assembly that embodies therein a snow brake and delivers a braking force that is approximately four times that of brake units of approximately the same height and constructed in accordance with the teachings of the hereinbefore-mentioned Newell et al patent.

Moreover, this brake assembly delivers approximately 1.5 times as much braking force as a hydro-pneumatic brake unit constructed in accordance with the teachings of the Clemmons et al patent and has a height approximately one half that of the hydro-pneumatic unit.

SUMMARY OF THE INVENTION

According to the present invention, a novel brake assembly is provided that comprises a casing which is pivotally mounted with respect to a fixed part of a vehicle, such as a side frame of a railway vehicle truck, and has a bore therein in which is slidably mounted a piston having a piston rod that intermediate its ends is operatively connected to one end of each of a pair of levers, the respective opposite end of each lever being pivotally rockable about one of a pair of diametrically-arranged inwardly-extending fulcrums that are integral with the wall of an annular chamber in the casing, this chamber being separated from the bore in this casing by a wall provided with an aperture through which the piston rod extends.

Intermediate its ends, each lever is provided with means for transmitting a force to one of a pair of clutch elements which, when in clutching engagement, are effective to prevent rotation of a first member provided with a non-self-locking screw thread with respect to a second member provided with a non-self-locking screw thread that has screw-threaded engagement with the non-self-locking screw thread on the first member. One of these screw-threaded members constitutes a brake rod, one end of which has a turning fit with respect to a brake-shoe-carrying brake head that is suspended by a pair of brake hangers from the side frame of the vehicle truck. When the two members are locked by the clutch elements, braking force is transmitted therethrough to the brake-shoe-carrying brake head to effect a brake application on the tread surface of a vehicle wheel.

The other end of the brake rod member has a sliding connection, by means of splines, with a third member that carries one of the clutch elements. A snow brake spring is interposed between the clutch and the brake-shoe-carrying brake head and is effective to constantly bias the brake shoe against the tread of the wheel with a chosen degree of force whereby heat is generated to prevent accumulation of snow.

Should appreciable brake shoe wear occur while a brake application is in effect in response to the supply of fluid under pressure to one side of the piston, the subsequent release of this fluid under pressure renders the snow brake spring effective to shift one of the screw-threaded members relative to the other to maintain the brake shoe constantly pressed against the tread surface of the wheel, it being understood that the amount of shifting of one of these members relative to the other corresponds to the brake shoe wear that occurred while the brake application was in effect.

DESCRIPTION — FIG. 1

Figure 1:
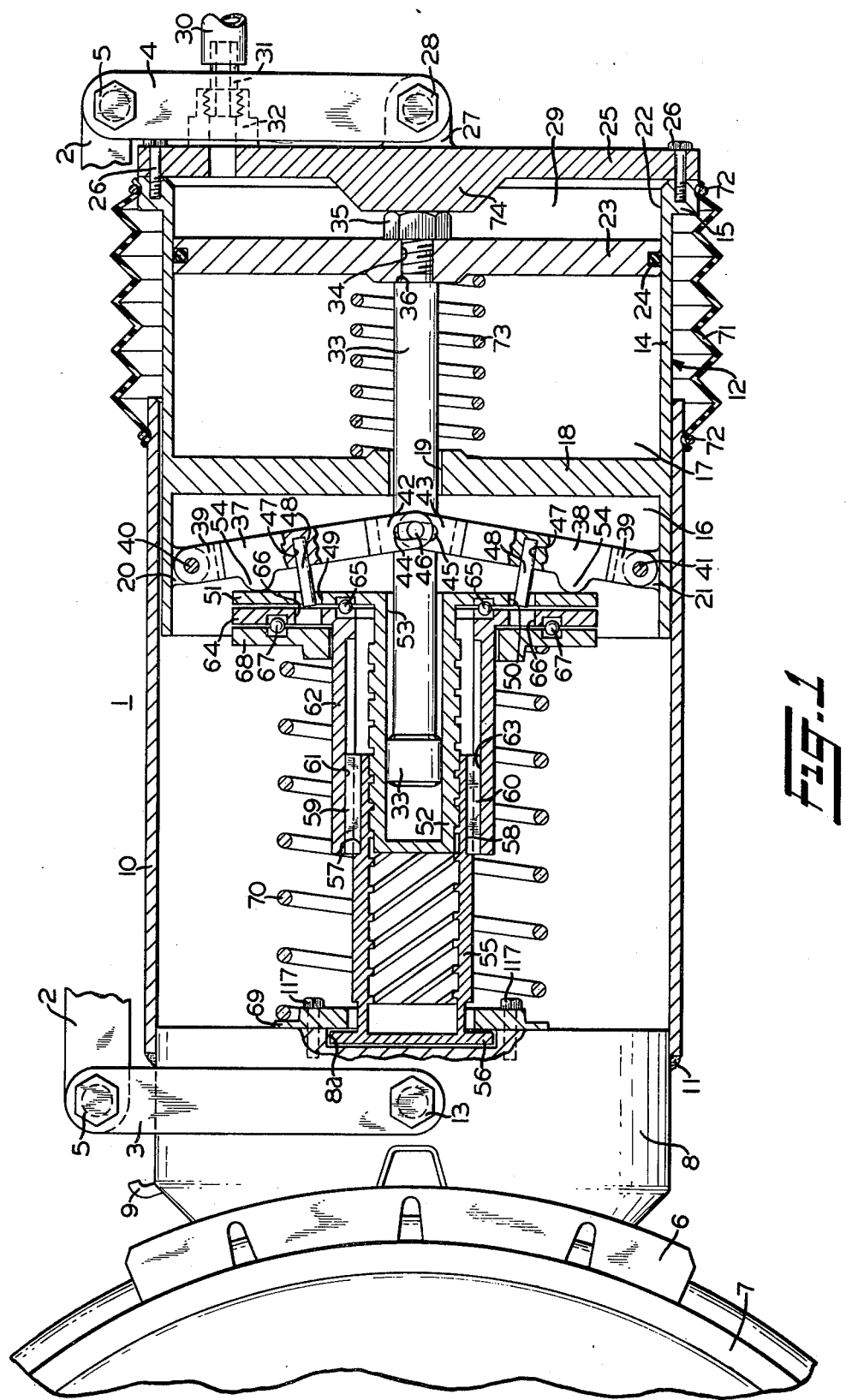
FIG. 1 is a vertical cross-sectional view of a brake assembly constituting a first embodiment of the invention and showing the manner by which this brake assembly is mounted on a railway passenger car truck.

As shown in FIG. 1 of the drawings, a brake assembly 1, one of which is provided for each wheel of a railway passenger car truck, is suspended from a pair of angle brackets 2, that are attached as by welding to a side frame (not shown) of the truck, by two pairs of brake hangers 3 and 4, the upper end of each brake hanger being rockably mounted on a bolt 5 and a nut (not shown) that secures the respective pair of hangers to the corresponding angle bracket 2.

The brake assembly 1 comprises a brake shoe 6 for movement into braking contact with the tread surface of a wheel 7 of the car truck, a brake head 8 to which the brake shoe 6 is secured, as by a key 9, the above-mentioned pair of brake hangers 3 and 4, and a sectionalized casing comprising a hollow cylinder 10, to the left-hand end of which the brake head 8 is secured as by welding indicated by the reference numeral 11, and a brake cylinder section 12.

The brake head 8 is disposed between the pair of brake hangers 3, only one of which appears in the drawing, and is pivotally connected to these hangers by a bolt 13 and a nut (not shown).

The brake cylinder section 12 comprises a cylindrical member 14, the left-hand end of which extends with a sliding fit into the right-hand end of the hollow cylinder 10. The right-hand end of this cylindrical member 14 has formed integral herewith an out-turned flange 15.

The cylindrical member 14 may be in the form of a casting having a pair of inwardly extending chambers 16 and 17 that are separated by a wall 18 in which is provided a bore 19. Cast integral with the cylindrical member 14 are a pair of diametrically arranged bosses or fulcrum members 20 and 21 that extend into the annular chamber 16.

Formed as by machining and coaxial with the bore 19, is a coaxial counterbore 22 that extends inward from the right-hand end of the cylindrical member 14 to the wall 18 and receives slidably therein a fluid-pressure-actuated brake-applying piston 23. The outer periphery of piston 23 is provided with an annular groove in which is disposed an O-ring seal 24 that forms a seal with the wall surface of the counterbore 22.

The outer end of the counterbore 22 is closed by a pressure head 25 that is secured to the out-turned flange 15 by a plurality of cap screws 26 that extend through arcuately-arranged smooth bores in the pressure head 25 and have screw-threaded engagement with coaxial screw-threaded bottomed bores provided therefor in the out-turned flange 15.

The right-hand side of the pressure head 25 is provided with a clevis 27 to which the lower end of the pair of brake hangers 4 is pivotally connected by a bolt 28 and a nut (not shown).

The piston 23 and pressure head 25 cooperate with the counterbore 22 to form therebetween a pressure chamber 29 to which fluid under pressure may be supplied via a hose 30, a nipple 31 and a pipe fitting 32 by operation of the brake control valve device of the usual air brake equipment on railway cars under the control of the operator.

A piston rod 33 that extends through the bore 19 in the wall 18 into the chamber 17 and also through a bore 34 in the piston 23 is provided adjacent its right-hand end with external screw threads for receiving a nut 35 which, when tightened, forces the left-hand side of the piston 23 against a shoulder 36 formed on this piston rod 33 to thereby rigidly connect the piston 23 to the piston rod 33.

The piston rod 33 transmits a braking force from the piston 23 to the brake-shoe-carrying brake head 8 through a linkage or clutch mechanism which will now be described in detail.

A pair of levers 37 and 38 each have at one end a first clevis 39 that enables the lever 37 to be pivotally mounted on the boss 20 by a pin 40 and the lever 38 to be pivotally mounted on the boss 21 by a pin 41.

The lver 37 has at its other end a second clevis 42 the jaws of which are sufficiently spaced apart to receive therebetween the jaws of a second clevis 43 at the other end of the lever 38, it being understood, as is apparent from FIG. 1, that the jaws of this second clevis 43 of the lever 38 are sufficiently spaced apart to receive therebetween the piston rod 33. The jaws of the clevis 42 are each provided with an elongated slot 44 and the jaws of the clevis 43 are each provided with an elongated slot 45. A pin 46 extending through a bore in the piston rod 33 and also the slots 44 and 45 operatively connects the levers 37 and 38 to the piston rod 33.

As shown in FIG. 1 of the drawings, intermediate their ends, each of the levers 37 and 38 is provided with a bottomed bore 47 into which is pressed a pin 48. The outer ends of the two pins 48 extend respectively into diametrically-arranged apertures or bores 49 and 50 provided therefore in a first out-turned flange 51 that is integral with the right-hand end of a first cylindrical member 52. Extending into this cylindrical member 52 from the right-hand end thereof is a bottomed bore 53 that guidably receives therein the outer or left-hand end of the piston rod 33.

Intermediate the pin 48 carried by each of the levers 37 and 38 and the pivoted end of the respective lever, each of these levers is provided with a projecting boss 54. These bosses 54, as shown in FIG. 1, abut the right-hand side of the out-turned flange 51 at diametrically-opposite locations thereon and serve to transmit force from the levers 37 and 38 to this flange 51 to shift it and the cylindrical member 52 in the direction of the left hand, as viewed in FIG. 1, in response to rocking of the levers 37 and 38 about the respective pins 40 and 41.

The periphery of the above-mentioned first cylindrical member 52 has formed thereon an external fast travel or non-self-locking screw thread that engages or meshes with an internal fast travel or non-self-locking screw thread formed within a second cylindrical or hollow brake rod nut member 55 that has a second out-turned flange 56 integral with the left-hand end thereof. This out-turned flange 56 is disposed with a turning fit within a bottomed bore 8a provided therefor in the right-hand side of the brake head 8. Thus, the second cylindrical member 55 is supported by the brake head 8 and the first cylindrical member 52 and rotatable with respect thereto.

As shown in FIG. 1, adjacent its right-hand end, the outer periphery of the second cylindrical member 55 is provided with a pair of diametrically opposite key-ways 57 and 58 that are parallel to the longitudinal axis of this cylindrical member 55. Disposed with a pressed fit in the key-way 57 is a spline 59, and disposed with a pressed fit in the key-way 58 is a spline 60.

The spline 59 extends with a sliding fit into a key-way 61 provided therefor within a sleeve member 62 that is provided with a second key-way 63 for receiving with a sliding fit the spline 60, it being apparent from FIG. 1 that these key-ways 61 and 63 are arranged diametrically opposite each other.

The right-hand end of the sleeve member 62 has formed integral therewith a third out-turned flange 64 that has the same outside diameter as the first out-turned flange 51. A first set of ball bearings 65 is interposed between the two out-turned flanges 51 and 64 to provide for rotary movement of the flange 64 with respect to the flange 51 to enable two diametrically opposite apertures or bores 66 of a plurality of arcuately-arranged apertures in the flange 64 to be rotated into coaxial alignment with the bores 49 and 50 in the flange 51, it being understood that the centers of the plurality of bores 66 in the out-turned flange 64 lie on a circle that has the same diameter as that of a circle passing through the centers of the bores 49 and 50 in the out-turned flange 51, and that the centers of these two circles lie on a line that is coaxial with the center line of the piston rod 33.

As shown in FIG. 1 of the drawings, a second set of ball bearings 67 is interposed between the left-hand side of the out-turned flange 64 and the right-hand side of a first annular spring seat 68 that is disposed in surrounding relation to the sleeve member 62 to provide for rotary movement of the flange 64 with respect to this spring seat 68.

Interposed between the first annular spring seat 68 and a second annular spring seat 69 that is disposed in surrounding relation to the second cylindrical member 55 is a snow brake spring 70 that is effective to bias the spring seat 69 against the right-hand side of the brake head 8 and thus, via this spring seat 69 and brake head 8, constantly press the braking surface of the brake shoe 6 against the tread surface of the wheel 7. The strength of this spring 70 is so selected that the brake shoe 6 is pressed against the tread surface of the wheel 7 with such a force that the heat generated therefrom will prevent the accumulation of ice and snow on the brake shoe 6 and brake head 8.

The spring 70 also enables limited rotation of the second cylindrical member 55 and the sleeve member 62 having the third out-turned flange 64 integral therewith with respect to the first cylindrical member 52 when effecting a brake release, in a manner hereinafter explained, to compensate for wear of the brake shoe 6 and/or the tread surface of the wheel 7 occurring while a brake application was in effect.

Since the left-hand end of the cylindrical member 14 is slidably mounted within the right-hand end of the hollow cylinder 10, it is apparent that the outer periphery of that portion of the cylindrical member 14 that extends into the hollow cylinder 10, and the internal surface of this hollow cylinder 10 that supports thereon the cylindrical member 14 should be machined, as for example, in a boring mill, to provide a smooth surface thereon. Therefore, in order to prevent subjecting these machines surfaces to the detrimental effect of water, ice and dirt, a rubber boot 71 surrounds a portion of the hollow cylinder 10 adjacent the right-hand end thereof and that portion of the cylindrical member 14 that is disposed outside of this hollow cylinder 10. The opposite upturned ends of the boot 71 are respectively disposed in annular grooves provided therefor in the hollow cylinder 10 adjacent its right-hand end and in the out-turned flange 15. A split metallic ring 72 encircles the left-hand upturned end of the boot 71 to hold it in the groove in the hollow cylinder 10. Likewise, a second split metallic ring 72 encircles the right-hand upturned end of this boot 71 to hold it in the groove in the out-turned flange 15.

In order to return the piston 23 to the position shown in FIG. 1 upon the release of fluid under pressure from the pressure chamber 29, a brake release spring 73 is disposed about the piston rod 33 and interposed between the piston 23 and the wall 18.

OPERATION — FIG. 1

Let it be assumed that the pressure chamber 29 in the brake cylinder section 12 is devoid of fluid under pressure. Accordingly, the snow brake spring 70 is effective to bias the brake shoe 6 against the tread surface of the wheel 7.

Moreover, the spring 70 is effective to rock the levers 37 and 38 to the position shown in FIG. 1, and the spring 73 is effective to return the piston 23 to its release position in which it is shown in which nut 35 abuts a boss 74 formed on the left-hand side of pressure head 25.

In operation, when it is desired to effect a brake application, fluid under pressure is admitted to the pressure chamber 29 through the hose 30, nipple 31 and pipe fitting 32 from the brake control valve device of the usual air brake equipment on railway passenger cars. Fluid under pressure thus supplied to the chamber 29 formed between the piston 23 and the pressure head 25 is effective to exert a fluid pressure force in the direction of the right hand on the pressure head 25 and in the direction of the left hand on the piston 23.

The fluid pressure force acting in the direction of the right hand on the pressure head 25 is effective to shift this pressure head 25 and the cylindrical member 14 in the direction of the right hand a short distance to effect counterclockwise rocking of the pair of brake hangers 4 through a small angle until the pressure head 25 strikes or abuts these brake hangers 4 which then prevent further shifting of the pressure head 25 and the cylindrical member 14 in the direction of the right hand.

The fluid pressure force acting in the direction of the left hand on the piston 23 is transmitted through the piston rod 33 to the pin 46 carried by this piston rod.

Since the pin 46 extends through the elongated slots 44 in the lever 37 and the elongated slots 45 in the lever 38, it is apparent that this pin transmits a force to the lever 37 to rock it in a clockwise direction about the pin 40 and a force to the lever 38 to rock it in a counterclockwise direction about the pin 41. It is apparent that equal forces are transmitted to the two levers.

It can be seen from FIG. 1 that clockwise rocking of the lever 37 about the pin 40 will cause the projecting boss 54 on this lever 37 to transmit a force to the first out-turned flange 51 that is integral with the first cylindrical member 52. It is likewise apparent that counterclockwise rocking of the lever 38 about the pin 41 will cause the projecting boss 54 on this lever 38 to transmit a force to this flange 51, it being evident that these two forces are equal in magnitude and are applied to this flange 51 at two diametrically opposite locations thereon.

Accordingly, it will be appreciated that these two forces act in the direction to cause shifting of the first cylindrical member 52 in the direction of the left hand, as viewed in FIG. 1.

Since the non-self-locking screw thread provided on the periphery of the first cylindrical member 52 engages or meshes with the non-self-locking screw thread provided on the interior of the second cylindrical member 55, it is apparent that any shifting of the non-rotatable first cylindrical member 52 in the direction of the left hand will cause rotation of the second cylindrical member 55 and the sleeve member 62 that has the third out-turned flange 64 formed integral with its right hand end since the second cylindrical member 55 and the sleeve member 62 are connected by the splines 59 and 60.

From the foregoing, it is apparent that, if a pair of the arcuately arranged apertures 66 in the third out-turned flange 64 are not in alignment with the two diametrically opposite bores 49 and 50 in the first out-turned flange 51 at the time the levers 37 and 38 begin their above-described rocking, the initial rotation of the out-turned flange 64 through a small angle will bring a pair of diametrically opposite apertures 66 into coaxial alignment with the bores 49 and 50, as shown in FIG. 1 of the drawings.

With a pair of diametrically opposite apertures 66 in the third out-turned flange 64 in coaxial alignment with the bores 49 andd 50 in the first out-turned flange 51, as shown in FIG. 1, it is apparent that as the lever 37 is rocked clockwise about the pin 40 by the force transmitted thereto from the piston 23 through the piston rod 33 and pin 46, the outer end of the pin 48 carried by this lever 37 will be moved into the upper aperture 66, as viewed in FIG. 1.

Likewise, it is apparent that as the lever 38 is rocked counterclockwise about the pin 41 by the force transmitted thereto from the piston 23 through the piston rod 33 and pin 46, the outer end of the pin 48 carried by this lever 38 will be moved into the lower aperture 66, as viewed in FIG. 1.

It will be noted that the diameter of the apertures or bores 66 is substantially greater than the diameter of the pins 48.

Moreover, it will be noted that the clockwise rocking of the lever 37 and the counterclockwise rocking of the lever 38 effects shifting of the first out-turned flange 51 and the first cylindrical member 52 in the direction of the left hand, as viewed in FIG. 1, and that this shifting causes, by reason of the non-self-locking screw threads and splines, rotation of the sleeve member 62 and the third out-turned flange 64 that is integral therewith and has therein the apertures 66. Since the diameter of these apertures or bores 66 is substantially larger than the diameters of the pins 48, these pins 48 are moved into these apertures 66 before the rotation of the third out-turned flange 64 moves this pair of apertures 66 far enough out of alignment with the bores 49 and 50 to prevent movement of the pins 48 into this pair of apertures 66.

Upon movement of the pins 48 into the pair of diametrically opposite apertures 66 in the third out-turned flange 64, the wall surface of these apertures 66 will be moved into contact with these pins 48 upon rotation of this third out-turned flange 64 through a small angle from the position in which this flange 64 is shown in FIG. 1.

Upon movement of the wall surface of the pair of diametrically opposite apertures 66 in the flange 64 into contact with the pins 48, further angular movement or rotation of the second cylindrical member 55, sleeve member 62 and the third out-turned flange 64 that is integral therewith is prevented. These pins 48 now lock together the first out-turned flange 51 and the third out-turned flange 64.

It will now be apparent that the sum of the two forces transmitted to the first out-turned flange 51 by the projecting boss 54 on the lever 37 and the projecting boss 54 on the lever 38 will be transmitted through the first cylindrical member 52, the external non-self-locking screw thread thereon, the internal non-self-locking screw thread on the interior of the second cylindrical member 55, this member 55 and the second out-turned flange 56 on the left-hand end thereof, and the brake head 8 to the brake shoe 6 carried thereby to press this brake shoe 6 against the tread surface of the wheel 7 to thereby effect a brake application thereon. It will be understood, of course, that the braking force pressing the brake shoe 6 against the tread surface of the wheel 7 corresponds to the degree of pressure of the fluid present in the pressure chamber 29.

It will be apparent from FIG. 1 of the drawings that the levers 37 and 38 are only rocked through a very small angle in order to effect a brake application. However, it can be seen that this rocking of these levers 37 and 38 effects shifting in the direction of the left hand of the first out-turned flange 51, the third out-turned flange 64, separated from this flange 51 by the first set of bearings 65, and the spring seat 68 that is separated from the third out-turned flange 64 by the second set of bearings 67. This shifting of the spring seat 68 in the direction of the left-hand is effective to slightly further compress the snow brake spring 70.

When it is desired to release the brake application, the fluid under pressure supplied to the pressure chamber 29 is vented in the usual manner to atmosphere through the pipe fitting 32, nipple 31, hose 30 and the brake control valve device of the car brake system.

Upon the release of fluid under pressure from the chamber 29, the spring 73 is rendered effective to shift the piston 23 and piston rod 33 in the direction of the right hand, as viewed in FIG. 1, to the release position in which they are shown.

Moreover, upon the release of fluid under pressure from the pressure chamber 29 to atmosphere, the force of the snow brake spring 70 acting on the spring seat 68 shifts this seat 68, the out-turned flanges 64 and 51 and the two sets of ball bearings 67 and 65 a small amount in the direction of the right hand to effect counterclockwise rocking of lever 37 and clockwise rocking of lever 38 to the position in which they are shown in FIG. 1, it being noted that the pin 46 carried by the piston rod 33 is also effective to rock these levers to this position.

If, while a brake application is in effect, the braking surface of the brake shoe 6 wears away, the force transmitted to the brake head 8 will be transmitted through the bolt 13 to rock the pair of brake hangers 3 clockwise about the bolt 5 so that the braking surface of the brake shoe 6 will be maintained against the tread surface of the wheel 7 and this shoe 6 will continue to be pressed against the tread surface of this wheel with substantially the same braking force, it being noted that the lever 37 is rocked clockwise and the lever 38 counterclockwise as the brake shoe 6 wears away.

Now, upon the release of fluid under pressure from the pressure chamber 29 in the manner described above, the snow brake spring 70 will transmit a force through the spring seat 69 to the brake head 8 to maintain the braking surface of the brake shoe 6 pressed against the tread surface of the wheel 7.

It will be noted that the second out-turned flange 56 that is integral with the second cylindrical member 55 is interposed between the brake head 8 and the spring seat 69. Since the spring 70 is transmitting a force through the spring seat 69 to the brake head 8 to maintain the braking surface of the brake shoe 6 pressed against the tread surface of the wheel 7, the cylindrical member 55 will not be moved in the direction of the right hand upon the release of fluid under pressure from the pressure chamber 29.

Accordingly, it is apparent that the spring 70 now transmits a force through the spring seat 68, the set of ball bearings 67, the third out-turned flange 64, the set of ball bearings 65 and the first out-turned flange 51 to the first cylindrical member 52 which force acts in the direction of the right hand, as viewed in FIG. 1.

By reason of the external non-self-locking screw threads on the periphery of the cylindrical member 52, the internal non-self-locking screw threads on the interior of the second cylindrical member 55 and the two sets of ball bearings 67 and 65, the first cylindrical member 52 and the first outturned flange 51 integral therewith, and the spring seat 68 will now be shifted in the direction of the right hand to cause rotation of the second cylindrical member 55 and the sleeve member 62 which has the third out-turned flange 64 integral therewith and is connected to the second cylindrical member 55 by the splines 59 and 60, it being understood that the two sets of ball bearings 67 and 65 enable this rotation of the third out-turned flange 64 which is integral with the right-hand end of the sleeve member 62.

It should be noted that the splines 59 and 60 enable the sleeve member 62 and the third out-turned flange 64 that is integral therewith to shift longitudinally in the direction of the right hand relative to the second cylindrical member 55 as this member 55, sleeve member 62 and flange 64 rotate together.

It is apparent that this shifting of the first out-turned flange 51 in the direction of the right hand is effective via the two projecting bosses 54 on levers 37 and 38 to cause counterclockwise rocking of the lever 37 about the pin 40 and clockwise rocking of the lever 38 about the pin 41.

Moreover, it is apparent that this rocking of the levers 37 and 39, by reason of the respective slots 44 and 45 therein, transmits a force through the pin 46 to the piston rod 33 which acts in the direction of the right hand to assist the spring 73 in shifting the piston 23 in the direction of the right hand until the nut 35 abuts the boss 74.

From the foregoing, it is apparent that the snow brake spring 70 maintains the braking surface of the brake shoe 6 constantly pressed against the tread surface of the wheel 7 notwithstanding the wearing away of the brake shoe 6. Therefore, this spring 70, together with the external non-selflocking screw thread on the periphery of the first cylindrical member 52, the internal non-self-locking screw thread on the interior of the second cylindrical member 55 and the splines 59 and 60 between this member 55 and the sleeve member 62 constitute a slack adjuster that operates to compensate for the wearing away of the braking surface of the brake shoe 6 while a brake application is in effect.

The advantage of the brake assembly 1, constituting the first embodiment of the present invention, over the railway wheel tread brake units disclosed in the hereinbefore-mentioned U.S. Pat. Nos. 2,940,553 and 3,837,443 can be best illustrated by way of the following examples.

Assume that the diameter of the boot 71 of the brake assembly 1 constituting the present invention is 9 inches, it being apparent that this is the limiting dimension in regard to the height of the space required to mount this brake assembly 1 on a railway vehicle truck.

Further assume that: (1) the distance between the center of the pin 46 and the centers of the pins 40 and 41 is 3.375 inches, (2) the length of the lever arms between the centers of the pins 40 and 41 and the projecting bosses 54 is .875 inch, (3) the length of the lever arms between the center of the pin 46 and the projecting bosses 54 is 2.5 inches, (4) the diameter of the piston 23 is 7.156 inches, and (5) the pressure of the fluid supplied to the pressure chamber 29 is 50 pounds per square inch.

It can be shown mathmatically that this fluid pressure of 50 pounds per square inch in the chamber 29 will cause the braking surface of the brake shoe 6 to be pressed against the tread surface of the wheel 7 with a force of approximately 7,700 pounds.

Considering now a railway wheel pneumatic tread brake unit of the type disclosed in the above-mentioned U.S. Pat. No. 2,940,553, let it be assumed that: (1) the height of this brake unit is also 9 inches, (2) the distance between the pin 29 (FIG. 2 of U.S. Pat. No. 2,940,553) and the center line of the brake rod 52 (at the center of the sphere 48) is 6.5 inches, (3) the distance between the pin 29 and the pin 33 is 5.5 inches, (4) the distance between pin 33 and the center of the brake rod 52 is 1.0 inch, (5) the diameter of the piston 14 is 3.0 inches, and (6) the pressure of the pneumatic fluid supplied to the pressure chamber 22 is 50 pounds per square inch.

It can be shown mathematically that this fluid pressure of 50 pounds per square inch in the pressure chamber 22 will cause the braking surface of the brake shoe 1 to be pressed against the tread surface of the wheel 2 with a force of approximately 1,943 pounds.

From the foregoing examples, it is apparent that a brake assembly constructed in accordance with the teachings of the present invention and having the same heighth, and therefore requiring approximately the same space when mounted on a railway vehicle truck, as the height of a railway wheel tread brake unit constructed in accordance with the teaching of U.S. Pat. No. 2,940,553, will provide 3.9 times (7,700 lbs÷1,940 lbs) as much braking force as a tread brake unit constructed according to the teachings of U.S. Pat. No. 2,940,553.

As hereinbefore stated, a hydro-pneumatic brake unit constructed in accordance with the teaching of U.S. Pat. No. 3,837,443 has an overall heighth of approximately 20 inches or more. Such a brake unit having an overall heighth of approximately 20 inches has: (1) a piston 20 having a diameter of 4.812 inches subject to air under a pressure of 50 pounds per square inch, (2) a master hydraulic piston having a diameter of 1.561 inches, and (3) a brake applying piston 4 having a diameter of 3.626 inches subject to hydraulic fluid under pressure.

It can be shown mathematically that this air pressure of 50 pounds per square inch acting on the piston 20 will cause the braking surface of the brake shoe 41 to be pressed against the tread surface of the wheel 42 with a force of approximately 4,850 pounds.

Therefore, the brake assembly 1 constructed in accordance with the teaching of the present invention and having approximately the same height as a brake unit constructed in accordance with the teaching of U.S. Pat. No. 2,940,553, will provide 3.9 times as much braking force for pressing the braking surface of a brake shoe against the tread surface of a wheel.

Moreover, this brake assembly 1, which has a height of approximately one-half that of the hydro-pneumatic brake unit considered above and constructed according to the teaching of U.S. Pat. No. 3,837,443, will provide 1.5 times as much braking force for pressing the braking surface of a brake shoe against the tread surface of a wheel.

Thus, the superiority of the brake assembly 1 over the pneumatic brake unit disclosed in U.S. Pat. No. 2,940,553 and the hydro-pneumatic brake unit disclosed in U.S. Pat. No. 3,837,443 is readily apparent.

DESCRIPTION — FIG. 2

Figure 2:
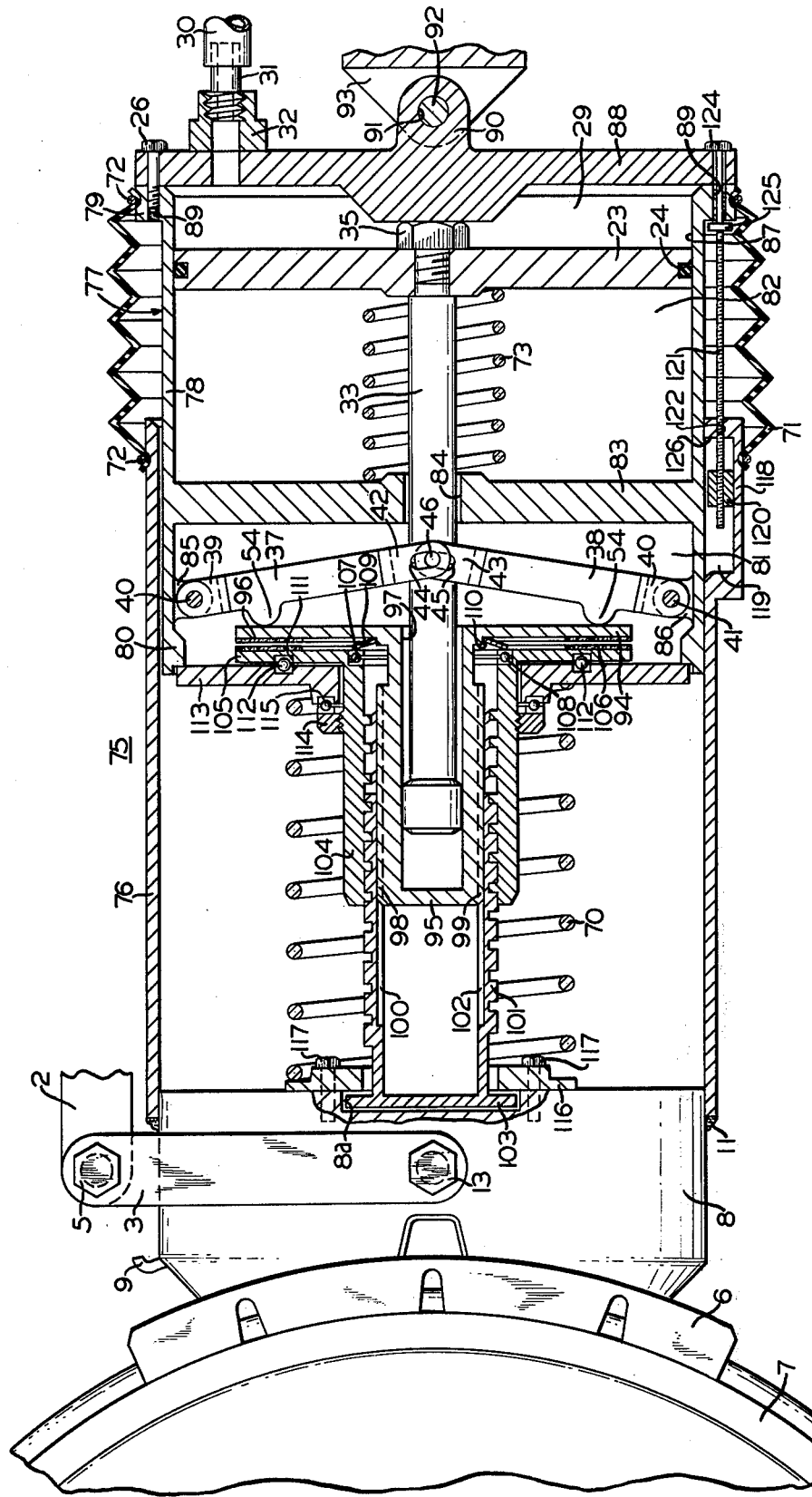
FIG. 2 is a vertical cross-sectional view of a brake assembly constituting a second embodiment of the invention and showing the manner by which this brake assembly is mounted of a railway passenger car truck.

In FIG. 2 of the drawings, there is shown a vertical cross-sectional view of a brake assembly 75 constructed in accordance with a second embodiment of the invention. According to this second embodiment of the invention, the brake assembly 75 shown in FIG. 2 differs from the brake assembly 1 shown in FIG. 1 in the construction of the mechanism through which the braking force is transmitted from the two pivoted levers to the brake-shoe-carrying brake head. Accordingly, like reference numerals have been used to designate the structure shown in FIG. 2 which is identical to that shown in FIG. 1. Only such features of the structure and operation of the embodiment of the invention shown in FIG. 2 which differ from that of the embodiments of FIG. 1 will be hereinafter described.

According to the embodiment of the invention disclosed in FIG. 2, the brake assembly 75 is identical to that shown in FIG. 1 except that a friction clutch mechanism shown in FIG. 2 replaces the locking mechanism provided by the pins 48 carried by the levers 37 and 38, the bores 49 and 50 in the out-turned flange 51 and the plurality of bores 66 in the out-turned flange 64 shown in FIG. 1, the non-self-locking screw threads are provided respectively on the periphery of the cylindrical member rather than on the interior of this member and on the interior of a sleeve member that is disposed about this cylindrical member, and the splined connection is provided between the two concentric cylindrical members rather than between the outer cylindrical member and the sleeve member.

As shown in FIG. 2, the left-hand end of the brake assembly 75 is suspended from an angle bracket 2 that is attached, as by welding, to a side frame of a railway passenger car truck, by the pair of brake hangers 3, the upper end of each hanger 3 being rockably mounted on the bolt 5, as in the first embodiment of the invention.

The brake assembly 75 comprises the brake shoe 6 for movement into braking contact with the tread surface of the wheel 7 of the car truck, the brake head 8 to which the brake shoe 6 is secured by the key 9, the above-mentioned brake hangers 3 and a sectionalized casing comprising a hollow cylinder 76, to the left-hand end of which the brake head 8 is secured as by welding indicated by the reference numeral 11, and a brake cylinder section 77.

The head 8 is secured to the brake hangers 3 by the bolt 13, as in the first embodiment of the invention.

The brake cylinder section 77 comprises a cylindrical member 78, the left-hand end of which extends with a sliding fit into the right-hand end of the hollow cylinder 76.

The cylindrical member 78 may be in the form of a casting that has formed integral with its right-hand end an out-turned flange 79. Adjacent its left-hand end an in-turned flange 80 is formed integral therewith. Furthermore, this casting is provided with a pair of inwardly extending chambers 81 and 82 that are separated by a wall 83 in which is provided a bore 84 which corresponds to the bore 19 shown in FIG. 1 of the drawings. Cast integral with the cylindrical member 78 are a pair of fulcrum members or bosses 85 and 86 that extend into the chamber 81 and serve the same purpose as the bosses 20 and 21 shown in FIG. 1.

Formed as by machining and coaxial with the bore 84, is a counterbore 87 that extends inward from the right-hand end of the cylindrical member 78 to the wall 83 and receives slidably therein the piston 23 having thereon the O-ring seal 24 that forms a seal with the wall surface of this counterbore 87.

The outer end of the counterbore 87 is closed by a pressure head 88 that is secured to the out-turned flange 79 by the cap screws 26 that extend through arcuately arranged smooth bores in the pressure head 88 and have screw-threaded engagement with coaxial screw-threaded bores 89 provided therefore in the out-turned flange 79.

The right-hand side of the pressure head 88 is provided with a lug 90 having therein a bore 91. A pin 92 extends through the bore 91 and has its opposite ends anchored in the jaws of a clevis 93, only one of which jaws appears in FIG. 2. This clevis 93 may be secured in any suitable manner to the side frame of the railway passenger car truck and serves to support the right-hand end of the brake assembly 75.

The piston 23 and presssure head 88 cooperate with the counterbore 87 to form the pressure chamber 29 to which fluid under pressure may be supplied by operation of the usual air brake equipment on railway cars as in the first embodiment of the invention.

As shown in FIG. 2 of the drawings, the lever 37 is pivotally mounted on the boss 85 by the pin 40 and the lever 38 is pivotally mounted on the boss 86 by the pin 41. The levers 37 and 38 are operatively connected to the piston rod 33 by the pin 46.

According to the second embodiment of the invention shown in FIG. 2 of the drawings, a first out-turned flange 94 is formed integral with the right-hand end of a first cylindrical member 95. Secured to the left-hand side of the out-turned flange 94 by any suitable means is a first annular clutch element 96 that is constructed of any suitable friction material.

Extending into the first cylindrical member 95 from the right-hand end thereof is a bottomed bore 97 that guidably receives therein the outer or left-hand end of the piston rod 33.

Formed integral with the cylindrical member 95 are a pair of outwardly extending diametrically arranged splines 98 and 99. The spline 98 extends with a sliding fit into a key-way 100 provided therefor within a second cylindrical or hollow brake rod screw member 101 that is provided with a second key-way 102 for receiving with a sliding fit the spline 99, it being apparent from FIG. 2 that these key-ways 100 and 102 are arranged diametrically opposite each other.

As shown in FIG. 2, the left-hand end of the hollow brake rod screw member 101 has formed integral therewith a second out-turned flange 103 that is disposed with a turning fit within the bottomed bore 8a in the right-hand side of the brake head 8.

The periphery of the hollow brake rod screw member 101 has formed thereon a non-self-locking screw thread that engages or meshes with an internal non-self-locking screw thread formed within a sleeve member 104. Formed integral with the right-hand end of sleeve member 104 is a third out-turned flange 105 that has substantially the same diameter as the first out-turned flange 94.

Secured to the right-hand side of the flange 105 by any suitable means is a second annular clutch element 106 that may be constructed of the same friction material and have the same inside and outside diameter as the first clutch element 96.

As shown in FIG. 2, the right-hand end of the sleeve member 104 is provided with a counterbore 107 in which is disposed a first set of ball bearings 108 against which rest the larger end of a Belleville spring 109 the smaller end of which abuts a shoulder 110 formed on the left-hand side of the first out-turned flange 94. While the pressure chamber 29 is devoid of fluid under pressure, the Belleville spring 109 is effective to bias the first clutch element 96 out of clutching engagement with the second clutch element 106.

The left-hand side of the third out-turned flange 105 is provided with an annular groove 111 in which is disposed a second set of ball bearings 112 that is interposed between this flange 105 and the right-hand side of a first annular spring seat 113 that is disposed in surrounding relation to the sleeve member 104.

As shown in FIG. 2 of the drawings, intermediate its ends the sleeve member 104 is provided with external screw threads for receiving thereon a nut member 114 between which and the spring seat 113 is disposed a third set of ball bearings 115. This set of ball bearings 115 in cooperation with the ball bearings 112 enable the sleeve member 104 and out-turned flange 105 that is integral therewith to rotate with respect to the first spring seat 113 between which and a second annular spring seat 116 that is secured to the right-hand side of the brake head 8 by a plurality of cap screws 117, is interposed the snow brake spring 70 that is normally effective to bias the first annular spring seat 113 against the inturned flange 80 that is integral with the cylindrical member 78 adjacent its left-hand end, it being understood that the snow brake spring 70 is stronger than the Belleville spring 109. Consequently, in the absence of fluid under pressure in the pressure chamber 29, the snow brake spring 70 is effective to simultaneously bias the braking surface of the brake shoe 6 against the tread surface of the wheel 7 and the spring seat 113 against the inturned flange 80, and the Belleville spring 109 is effective to bias the first out-turned flange 94 against the projecting bosses 54 on the levers 37 and 38 so that the first annular clutch element 96 is out of clutching engagement with the second annular clutch element 106.

In order to let out slack prior to replacing a worn brake shoe 6, the brake assembly 75 is provided with a slack-let-out mechanism which will now be described, it being understood that the brake assembly 1 shown in FIG. 1 may also be provided with this slack-let-out mechanism.

As shown in FIG. 2 of the drawings, the hollow cylinder 76 has formed on the bottom of its right-hand end a longitudinally extending boss 118. Formed within this boss 118, as by a matching operation, is a longitudinally extending groove 119 that in cross section may have any suitable polygonal shape. In actual practice the groove 119 may be square in cross section in order to receive therein a square nut 120 that has screw-threaded engagement with external screw threads formed on an operating stem 121. This stem 121 extends with slight clearance through a bore 122 in the boss 118 at the right-hand end of the groove 119, one of the screw-threaded bores 89 in the out-turned flange 79 and the smooth bore in the pressure head 88 that is coaxial with the bore 89, it being apparent from FIG. 2 that these bores are coaxial with the bore 122.

The operating stem 121 has a bolt head 124 formed integral with its right-hand end and has secured thereto, adjacent the left-hand side of the flange 79, a collar 125. That portion of the operating stem 121 extending from the collar 125 to the left-hand end thereof is provided with external screw threads, it being understood that the portion of this stem 121 extending between the collar 125 and the bolt head 124 need not be provided with screw threads.

When a worn brake shoe 6 is to be replaced with a new brake shoe, a workman will apply a wrench to the bolt head 124 and thereafter, by means of this wrench, rotate the stem 121 in the direction to cause the square nut 120, which cannot rotate, to travel along this stem 121 in the direction of the right hand until this nut 120 abuts a stop surface 126 at the right-hand end of the groove 119.

Continued rotation of the stem 121 by the wrench will cause the nut to travel further along this stem in the direction of the right hand, as viewed in FIG. 2. This movement of the nut 120 in the direction of the right hand is effective to shift the hollow cylinder 76 and the brake head 8 in this direction against the yielding resistance of the spring 70 thereby moving the brake shoe 6 away from the tread surface of the wheel 7.

When the worn brake shoe has been moved away from the tread surface of the wheel 7 far enough to provide a space sufficient for the new brake shoe, the brake shoe key 9 is withdrawn, the worn brake shoe removed and the new brake shoe then secured to the brake head 8 by means of the key 9.

Subsequent to securing the new brake shoe to the brake head 8, the workman will rotate the wrench in the opposite direction to cause the nut 120 to travel along the stem 121 in the direction of the left hand.

As the nut 120 travels along the stem 121 in the direction of the left hand, the spring 70 is rendered effective to shift the brake-shoe-carrying brake head 8 and the hollow cylinder 76 in the same direction until the braking surface of the new brake shoe contacts the tread surface of the wheel 7.

Subsequent to the braking surface of the new brake shoe contacting the tread surface of the wheel 7, the workman will continue to rotate the stem 121 by means of the wrench to cause the nut 120 to move away from the stop surface 126 as it travels in the direction of the left hand along the stem 121.

The stem 121 is rotated by the wrench until the nut 120 reaches the position shown in FIG. 2.

It will be understood that, when the nut 120 is spaced away from the stop surface 126 the distance shown in FIG. 2, the braking surface of the brake shoe can wear away the maximum allowable amount without the spring 70 shifting the hollow cylinder 76 in the direction of the left hand far enough for the stop surface 126 to abut the right-hand side of the nut 120.

OPERATION — FIG. 2

Let it be assumed that the pressure chamber 29 is devoid of fluid under pressure so that the springs 70 and 73 are effective to bias the various elements of the brake assembly 75 to their release position in which they are shown in FIG. 2.

In operation, fluid under pressure is supplied to the pressure chamber 29 in the manner described in connection with the first embodiment of the invention.

The fluid under pressure acting on the right-hand side of the piston 23 transmits a force through the piston rod 33 and pin 46 to cause clockwise rocking of the lever 37 about the pin 40 and counterclockwise rocking of the lever 38 about the pin 41. Accordingly, it is apparent that two equal forces are applied to the out-turned flange 94 to cause shifting of this flange and the first cylindrical member 95 in the direction of the left hand, as viewed in FIG. 2, since the splines 98 and 99, which are integral with the member 95, may slide in the key-ways 100 and 102.

Referring to FIG. 2, it is apparent that this shifting of the flange 94 in the direction of the left hand, against the yielding resistance of the Belleville spring 109, is effective to bring the first annular clutch element 96 into clutching engagement with the second clutch element 106 that is secured to the out-turned flange 105.

Subsequent to clutching engagement of the clutch elements 96 and 106, the sum of the two equal forces applied to the flange 94 will be transmitted through the clutch elements 96 and 106, flange 105, bearing elements 112, spring seat 113, bearing elements 115, nut member 114, sleeve member 104, the non-self-locking threads formed within this member 104, the non-self-locking threads formed on the periphery of the hollow brake rod screw member 101, the member 101, the flange 103 integral with member 101 and the brake head 8 to the brake shoe 6 carried thereby to press this brake shoe against the tread surface of the wheel 7 thereby effecting a brake application on this wheel.

It should be noted that upon clutching engagement of the clutch elements 96 and 106, the splines 98 and 99 prevent rotation of the hollow brake rod screw member 101 with respect to the sleeve member 104 so that the braking force is transmitted through this member 101 to the brake shoe 6.

When it is desired to release the brake application, the fluid under pressure in the chamber 29 is vented to atmosphere, as in the first embodiment of the invention, whereupon the springs 70 and 73 return the elements of the brake assembly 75 to the position shown in FIG. 2.

Now let it be assumed that the braking surface of the brake shoe 6 wears away while a brake application is in effect.

Accordingly, upon the release of fluid under pressure from the pressure chamber 29, the snow brake spring 70 will maintain the brake shoe 6 pressed against the tread surface of the wheel 7 and will also transmit a force through the spring seat 113 and bearing elements 112 to the out-turned flange 105 that carries thereon the annular clutch element 106. Consequently, as the levers 37 and 38 release the force transmitted to the out-turned flange 94 via the projecting bosses 54, the spring 70 prevents shifting of the hollow brake rod screw member 101 in the direction of the right hand and Belleville spring 109 effects disengagement of the annular clutch elements 96 and 106.

Upon disengagement of the clutch element 96 from the clutch element 106, the spring 70 transmits a force through the spring seat 113 and bearing elements 112 to the out-turned flange 105 which is effective to cause rotation of this flange 105 and the sleeve member 104 that is integral therewith relative to the hollow brake rod screw member 101.

Consequently, this flange 105, sleeve member 104 and spring seat 113 will be shifted in the direction of the right hand relative to the hollow brake rod screw member 101 until the spring seat 113 abuts the inturned flange 80, it being understood that the bearing elements 112 and 115 enable the flange 105 and sleeve member 104 to rotate without effecting rotation of the spring seat 113 which is subject to the biasing force of the spring 70.

From the foregoing, it is apparent that the sleeve member 104 is shifted relative to the hollow brake rod screw member 101 a distance equal to the amount of wear of the brake shoe 6 occurring while the brake application was in effect. Thus, the spring 70 acts as a snow brake and is also effective to take up slack resulting from brake shoe wear.

DESCRIPTION — FIGS. 3 AND 4

Figure 3:
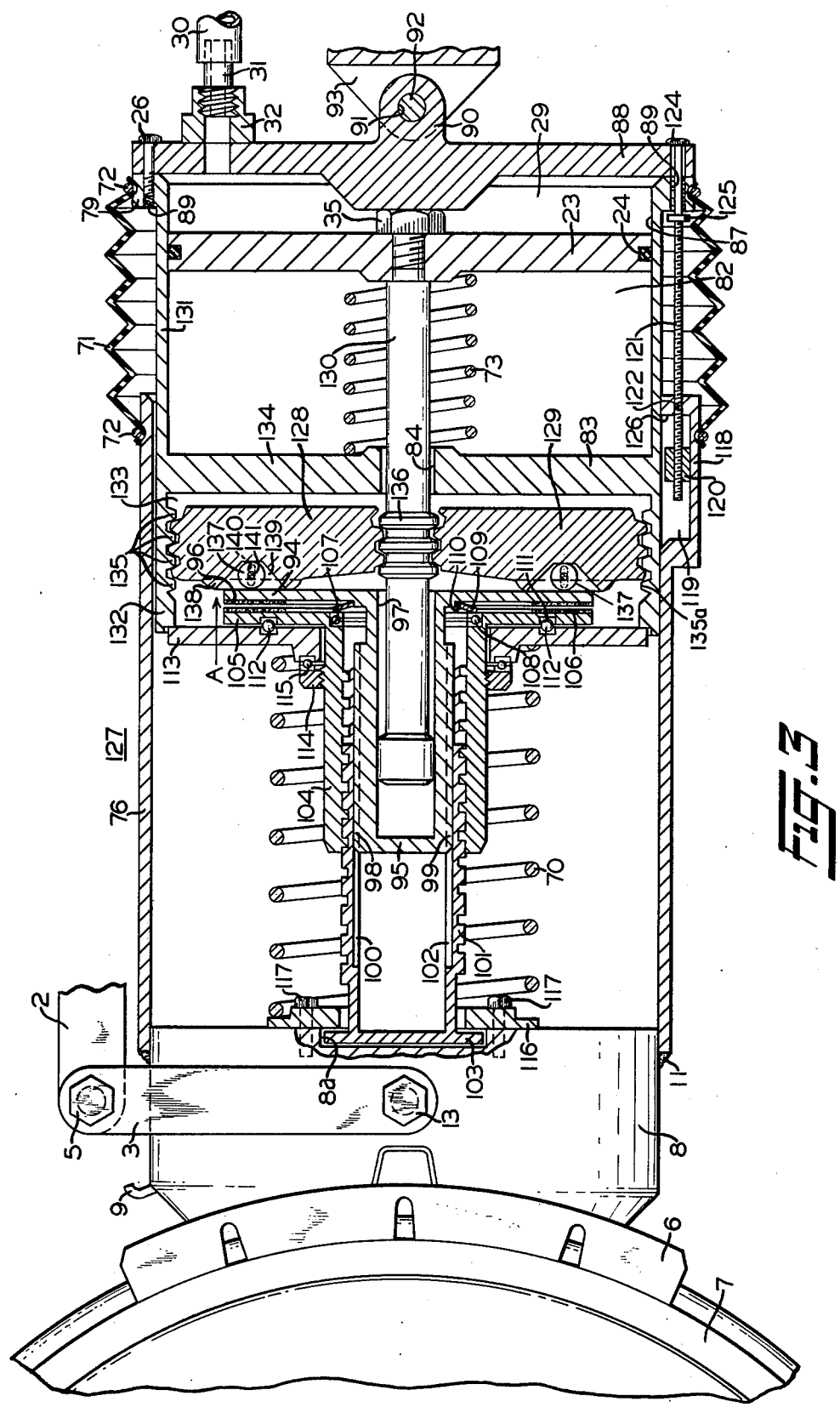
FIG. 3 is a vertical cross-sectional view of part of the brake assembly shown in FIG. 2 embodying a modified form of a force transmitting mechanism constructed in accordance with a third embodiment of the invention.

In FIG. 3 of the drawing there is shown a partial cross sectional view of a brake assembly 127 constructed in accordance with a third embodiment of the invention, it being understood that the remainder of this brake assembly 127 is identical in construction to the brake assembly 75 shown in FIG. 2. According to this third embodiment of the invention, the brake assembly 127 shown in FIG. 3 differs from the brake assembly 75 shown in FIG. 2 in the construction of the force transmitting means between the piston rod and the clutch mechanism. Accordingly, like reference numerals have been used to designate the structure shown in FIG. 3 which is identical to that shown in FIG. 2. Only such features of the structure and operation of the embodiment of the invention shown in FIG. 3 which differ from that of the embodiment of FIG. 2 will be hereinafter described.

According to the embodiment of the invention disclosed in FIG. 3, the brake assembly 127 is identical to the brake assembly 75 shown in FIG. 2 except that a pair of gear segments 128 and 129 replace the levers 37 and 38 shown in FIG. 2, a piston rod 130 replaces the piston rod 33 and a cylindrical member 131 replaces the cylindrical member 78.

As shown in FIG. 3, the cylindrical member 131 has formed integral therewith, adjacent its left-hand end an inturned flange 132 that corresponds to the inturned flange 80 shown in FIG. 2. Furthermore, this cylindrical member 131 is provided with a chamber 133 that is located on the left-hand side of a wall 134 that corresponds to the wall 83 shown in FIG. 2. Formed, as by a milling machine operation, on the wall of the chamber 133 and on the right-hand side of the inturned flange 132 are a pair of diametrically opposite racks 135 and 135a.

A circular rack 136 is formed, as, for example, by a milling machine operation, on the piston rod 130 at a location thereon that is on the left-hand side of the wall 134.

As shown in FIG. 3, the gear segment 128 meshes with the circular rack 136 on the piston rod 130 and the rack 135 formed on the wall of the chamber 133. Likewise, the gear segment 129 meshes with the circular rack 136 and the rack 135a.

The gear segments 128 and 129 each carry a roller 137.

The means by which the upper roller 137 is mounted on the gear segment 128 is the same as that by which the lower roller 137 is mounted on the gear segment 129. Therefore, a description of one will suffice for both.

As shown in FIG. 3, the left-hand side of the gear segment 128 is provided with a raised portion or boss 138 in which is formed, as by a milling machine operation, a cavity 139 for receiving therein the roller 137. Furthermore, the boss 138 is provided, as by a milling machine operation, with a pair of parallel spaced-apart elongated slots 140, these slots being disposed on the respective opposite sides of the cavity 139.

Figure 4:
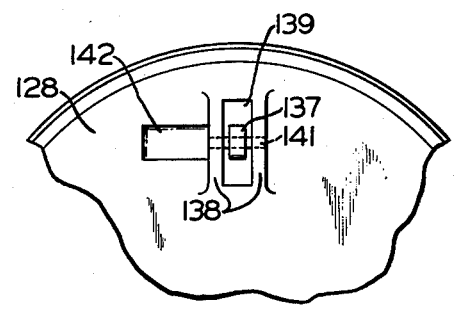
FIG. 4 is a partial view of one of the gear segments shown in FIG. 3 looking in the direction of the arrow A.

In order to permit a pin 141 to be inserted through the elongated slots 140, a semi-circular cavity 142, shown in FIG. 4 of the drawings, is formed in the left-hand side, as viewed in FIG. 4, of the gear segment 128. This semi-circular cavity 142 may be either cast or cut into this left-hand side of the gear segment by means such as a milling machine cutter. The length of this semi-circular cavity 142 is somewhat in excess of the length of the pin 141 and the diameter of this pin 141 is such as to provide a sliding fit between this pin and the elongated slots 140.

Accordingly, the pin 141 is placed or held in a position in the semi-circular cavity 142 in coaxial alignment with the elongated slots 140.

Then one end of this pin 141 is inserted through that one of the elongated slots 140 that is adjacent the semi-circular cavity 142.

It should be understood that the roller 137 is provided with a bore of such a diameter as to provide a tight fit between this roller and the pin 141 when this pin is inserted into this bore.

Consequently, the roller 137 is now placed in the cavity 139 (FIG. 4) and held in the position in which the bore in this roller is coaxial with the pin 141.

The pin 141 is now forced through the bore in the roller 137 by the use of any suitable means until the respective portions of this pin 141 that extend from the opposite sides of the roller 137 are slidably mounted in the two parallel spaced-apart elongated slots 140.

The above described construction enables the gear segments 128 and 129 to transmit force to the out-turned flange 94 that carries the annular clutch element 96 via the rollers 137 rather than via the pins 141. Thus, the possibility of the pins 141 being ruptured or broken in two by sheer forces is eliminated.

OPERATION — FIGS. 3 and 4

The fluid pressure force transmitted to the piston rod 130 by the piston 23 (FIG. 3) acts in the direction to shift this piston rod 130 in the direction of the left hand, as viewed in FIG. 3 of the drawings.

It is apparent from FIG. 3 that shifting of the piston rod 130 and circular rack 136 thereon in the direction of the left hand is effective to rotate the gear segment 128 clockwise so that it rolls along the rack 135. It is likewise apparent that this shifting of the piston rod 130 and circular rack 136 is effective to rotate the gear segment 129 counterclockwise so that it rolls along the rack 135a that is diametrically opposite the rack 135.

Furthermore, it is apparent that as the gear segment 128 rotates clockwise and the gear segment 129 rotates counterclockwise as they roll along their respective racks, each of these gear segments will transmit a force, via the roller 137 carried by the respective gear segment, to the out-turned flange 94.

These two equal forces transmitted to the out-turned flange 94 will cause clutching engagement of the two annular clutch elements 96 and 106.

Subsequent to engagement of the clutch elements 96 and 106, a braking force will be transmitted to the brake shoe 6 in the manner hereinbefore described in connection with the structure shown in FIG. 2.

Except as described above, the operation of the brake assembly 127 shown in FIG. 3 is the same as that of the brake assembly 75 shown in FIG. 2. Therefore, further description of the operation of the brake assembly 127 is deemed to be unnecessary.

In addition to a power operated brake assembly for each wheel of a railway vehicle truck, some suitable hand brake mechanism is provided for effecting a manual brake application. Accordingly, it will be understood that any suitable hand brake mechanism may be used with each of the brake assemblies 1, 75 and 127.

Having now described the invention what I claim as new and desire to secure by Letters Patent, is:

1. A brake assembly for applying a braking force to a vehicle wheel, said assembly comprising:
   a. a casing pivotally suspended with respect to the vehicle, said casing having therein a pair of chambers separated by a wall having therein a central bore, one of said chambers having a smooth cylindrical wall surface and the other having disposed therein at least one pair of oppositely extending fulcrum members formed integral with said casing,
   b. a piston slidably mounted in said one chamber and having a piston rod extending from one face thereof through said central bore in said wall into said other chamber, said piston being movable in opposite directions responsively to the supply of fluid under pressure to the other face thereof and the release of fluid under pressure therefrom,
   c. a pair of levers disposed in said other chamber, each of said levers being pivotally mounted at one end on one of said fulcrum members and operatively connected at the other end to said piston rod,
   d. a brake-shoe-carrying brake head pivotally suspended with respect to the vehicle,
   e. a hollow brake rod member rotatably mounted at one end with respect to said brake head and axially movable sustantially in a straight line, said hollow brake rod member being provided with a non-self-locking screw thread,
   f. a cylindrical member provided with a non-self-locking screw thread having screw-threaded engagement with the non-self-locking screw thread of said brake rod member, said cylindrical member being provided at one end thereof with a flange that is integral therewith,
   g. means for rendering said hollow brake rod member non-rotatable with respect to said cylindrical member in response to the supply of fluid under pressure to said other face of said piston and effective to cause the transmittal of a braking force from said pair of levers to said brake-shoe-carrying brake head while said hollow rod member is rendered non-rotatable with respect to said cylindrical member, and
   h. biasing means interposed between said flange and said brake-shoe-carrying brake head for constantly transmitting a limited force to said brake head and operative upon the release of said braking force only subsequent to the occurrence of brake shoe wear while said braking force was transmitted to said brake head, to cause rotation of said hollow brake rod member relative to said cylindrical member to increase the effective length of said hollow brake rod member to compensate for said brake shoe wear.

2. A brake assembly, as recited in claim 1, further characterized in that said brake head is provided with a bottomed bore, and said hollow brake rod member has formed integral therewith at its said one end an out-turned flange disposed with a turning fit in said bottomed bore whereby said hollow brake rod member is rotatably mounted with respect to said brake head.

3. A brake assembly, as recited in claim 1, further characterized in that said biasing means comprises a spring, and by a pair of spring seats, one of said spring seats being interposed between the other end of said spring and said means for rendering said hollow rod member non-rotatable.

4. A brake assembly, as recited in claim 2, further characterized in that said biasing means is effective to retain said out-turned flange integral with said one end of said hollow brake rod member within said bottomed bore in said brake head.

5. A brake assembly, as recited in claim 3, further characterized in that said spring constantly transmits a limiting force to said brake-shoe-carrying brake head via said one spring seat whereby said force causes said brake shoe to generate heat to prevent accumulation of ice on said brake-shoe-carrying brake head.

6. A brake assembly, as recited in claim 3, further characterized in that said biasing means is rendered effective in response to the release of fluid under pressure from said other face of said piston to simultaneously transmit a first force via said out-turned flange integral with said one end of said hollow brake rod member to effect shifting of said rod member relative to said cylindrical member to compensate for wear of said brake shoe occuring while said other face of said piston was subject to fluid under pressure, and a second force to said brake-shoe-carrying brake head to constantly maintain said brake shoe pressed against the vehicle wheel with a chosen force whereby said force causes said brake shoe to generate heat to prevent accumulation of snow on said brake-shoe-carrying brake head.

7. A brake assembly, as recited in claim 1, further characterized in that each of said pair of levers is provided adjacent its said other end with an elongated slot, and said piston rod is provided with a pin extending through said elongated slots, said pin and said elongated slots providing said operative connection between said levers and said piston rod.

8. A brake assembly, as recited in claim 1, further characterized in that each of said levers is provided with a clevis at each of its respective ends, the clevis one end of each lever enabling the respective lever to be pivotally mounted on one of said at least one pair of oppositely extending fulcrum members and the clevis at the other end of one of said levers being of such a size as to enable the clevis at the other end of the other of said levers to be disposed therebetween, said clevis at the other end of said other lever being of such a size as to enable said piston rod to be disposed therebetween, said clevis at said other end of each of said levers being provided with a pair of parallel spaced-apart elongated slots, and by a pin carried by said piston rod and extending through said elongated slots whereby said pin operatively connects said piston rod to said pair of levers to enable rocking of said levers in response to shifting of said rod.

9. A brake assembly, as recited in claim 1, further characterized in that each of said pair of levers is provided with a projecting boss so located thereon as to cooperate with said means for rendering said hollow brake rod member non-rotatable with respect to said cylindrical member in response to the supply of fluid under pressure to said other face of said piston as to enable the transmittal of a braking force from said pair of levers to said brake-shoe-carrying brake head while said hollow brake rod member is rendered non-rotatable with respect to said cylindrical member.

10. A brake assembly, as recited in claim 1, further characterized in that each of said pair of levers is provided with a projecting boss so located thereon as to abut said flange to enable said levers to transmit said braking force to said brake head via said flange, said cylindrical member integral therewith and said hollow brake rod member while non-rotatable with respect to said cylindrical member.

11. A brake assembly, as recited in claim 1, further characterized in that said cylindrical member is provided with means for guiding the exterior end of said piston rod.

12. A brake assembly, as recited in claim 1, further characterized in that said means for rendering said hollow brake rod member non-rotatable with respect to said cylindrical screw-threaded member and causing transmittal of said braking force from said pair of levers to said brake head while said rod member is rendered non-rotatable comprises:

a. a pair of diametrically arranged perforations provided in said flange integral with said cylindrical member, b. a sleeve member disposed about and so slidably mounted on said hollow brake rod member as to be rotatable therewith, said sleeve member having integral therewith at one end thereof a second perforated flange disposed in parallel spaced-apart relation to said first mentioned flange, and c. a pair of pins each anchored at one end in one of said levers at such a location thereon that the other end of said pin is so disposed as to be movable into a pair of perforations in said first and second perforated flanges upon the rocking of said levers from a brake release position toward a brake application position for rendering said hollow brake rod member non-rotatable thereby enabling said pair of levers to transmit a braking force to said brake-shoe-carrying brake head via said flanges, said cylindrical screw-threaded member and said hollow brake rod member.

13. A brake assembly, as recited in claim 1, further characterized in that said means for rendering said hollow brake rod member non-rotatable with respect to said cylindrical screw-threaded member and causing transmittal of said braking force from said pair of levers to said brake head while said rod member is rendered non-rotatable comprises:

a. a first clutch element slidably mounted with respect to said hollow brake rod member and rotatable therewith and so disposed as to about said levers, and b. a second clutch element formed integral with one end of said cylindrical member and coaxial with said first clutch element whereby rocking of said pair of levers from a brake release position toward a brake application position effects frictional engagement of said clutch elements for rendering said hollow brake rod member non-rotatable thereby enabling said pair of levers to transmit a braking force to said brake-shoe-carrying brake head via said clutch elements, said cylindrical member and said hollow brake rod member.

14. A brake assembly, as recited in claim 1, further characterized in that: each of said at least one pair of fulcrum members formed integral with said casing comprises a rack; said piston rod has formed thereon circular racks; and each of said levers comprises a gear that engages one of said racks integral with said casing and said circular racks formed on said piston rod to cause transmittal of said braking force to said brake-shoe-carrying brake head in response to ther supply of fluid under pressure to said other face of said piston.

15. A brake assembly, as recited in claim 9, further characterized in that said projecting boss on each of said levers is nearer one end than the other whereby said projecting boss provides the respective lever with two arms of unequal length.

16. A brake assembly, as recited in claim 11, further characterized in that said means for guiding the exterior end of said piston rod comprises a bore provided in said cylindrical member, said exterior end of said piston rod being disposed in said bore.

17. A brake assembly, as recited in claim 12, further characterized by a plurality of splines carried by said hollow brake rod member, and by a plurality of keyways provided in said sleeve member for receiving with a sliding fit said plurality of splines whereby said sleeve member is slidably mounted on and rotatable with said hollow brake rod member.

18. A brake assembly, as recited in claim 12, further characterized by a plurality of bearing elements interposed between said flange integral with said cylindrical member and said flange integral with said sleeve member.

19. A brake assembly, as recited in claim 12, further characterized in that said biasing means comprises:
  a. a spring,
  b. a first spring seat interposed between one end of said spring and said brake head, and
  c. a second spring seat abutting the other end of said spring, and by a plurality of bearing elements interposed between said second spring seat and said flange integral with said sleeve member.

20. A brake assembly, as recited in claim 13, further characterized in that:
  a. said biasing meas comprises:
    i. a spring,
    ii. a first spring seat interposed between one end of said spring and said brake head, and
    iii. a second spring seat abutting the other end of said spring;
  b. a first plurality of bearing elements are interposed between said second spring seat and said second clutch element;
  c. a second plurality of bearing elements are interposed between said second spring seat and said cylindrical member, and
  d. said first and second bearing elements enabling rotation of said second clutch element and said cylindrical member with respect to both said spring-biased second spring seat and said hollow brake rod member whereby said rotation of sid cylindrical member increases the effective length of said hollow brake rod member to compensate for brake shoe wear.

21. A brake assembly, as recited in claim 13, further characterized by a plurality of splines carried by said first clutch element, and by a plurality of key-ways provided in said hollow brake rod member for receiving with a sliding fit said plurality of splines whereby said hollow brake rod member is slidably mounted on and rotatable with said first clutch element, the slidable movement therebetween increasing the effective length of said member to compensate for brake shoe wear.

22. A brake assembly, as recited in claim 13, further characterized in that a spring is interposed between said first and second clutch elements to effect disengagement of said clutch elements and shifting of said first clutch element with respect to said hollow brake rod member in response to the release of fluid under pressure from said face of said piston thereby enabling rotation of said second clutch element and said cylindrical with respect to said first clutch element and said hollow brake rod member, said rotation of said cylindrical member relative to said hollow brake rod member causing an increase in the effective length of said hollow brake rod member to compensate for brake shoe wear.

23. A brake assembly, as recited in claim 14, further characterized in that: said means for rendering said hollow brake rod member non-rotatable with respect to said cylindrical screw-threaded member and causing transmittal of said braking force from said gears to said brake head while said rod member is rendered non-rotatable comprises:
  a. a first clutch element slidably mounted with respect to said hollow brake rod member and disposed in the path of movement of said gears as said gears roll on said racks,
  b. a second clutch element formed integral with one end of said cylindrical member and coaxial with said first clutch element, and
  c. means carried by each of said gears for transmitting force from each respective gear to said first clutch element to cause said first clutch element to so frictionally engage said second clutch element as to render said hollow brake rod member non-rotatable with respect to said cylindrical screw-threaded member whereby braking force is transmitted therethrough to said brake-shoe-carrying brake head.

24. A brake assembly, as recited in claim 15, further characterized in that the two arms of unequal length of said levers provide a mechanical advantage whereby the force transmitted to said brake-shoe-carrying brake head exceeds the force exerted on said piston by the fluid under pressure supplied to said other side thereof.

25. A brake assembly, as recited in claim 18, further characterized in that each of said plurality of bearing elements is a sphere.

26. A brake assembly, as recited in claim 19, further characterized in that each of said plurality of bearing elements is a sphere.

27. A brake assembly, as claimed in claim 22, further characterized in that each of said gears is provided with a pair of spaced-apart coaxial elongated slots, and said means comprises:
  a. a shaft having its respective opposite ends slidably mounted in said elongated slots, and
  b. a roller so rotatably mounted on said shaft as to roll along said first clutch element and transmit a force thereto simultaneously as the corresponding gear is rolled along one of said racks integral with said causing by force transmitted thereto by said circular racks formed on said piston rod in response to the supply of fluid under pressure to said other face of said piston.

28. A brake assembly for applying a braking force to a wheel of a vehicle, said assembly comprising:
   a. a brake-shoe-carrying brake head pivotally suspended with respect to the vehicle,
   b. a cylindrical casing pivotally suspended with respect to the vehicle, said casing having therein a bore and a pair of chambers separated by a wall that has therein a central bore, one of said pair of chambers being provided with a smooth cylindrical wall surface and the other with at least one pair of fulcrum members formed integral with said casing,
   c. a piston slidably mounted in said one chamber and having a piston rod extending from one face thereof through said central bore in said wall into said other chamber, said piston being movable in one direction responsive to the supply of fluid under pressure to the other face thereof,
   d. biasing means interposed between said wall and said one face of said piston for effecting movemet of said piston and piston rod in a direction opposite said one direction response to the release of fluid under pressure from said other face of said piston,
   e. a lever mechanism rockably mounted on said at least one pair of fulcrum members and operatively connected to said piston rod,
   f. means transmitting force from said lever mechanism to said brake-shoe-carrying brake head in response to rocking of said lever mechanism in one direction,
   g. a hollow cylindrical member secured at one end to said brake head and slidably supporting therein one end of said casing, said hollow cylindrical member being provided with a guideway having at one end a stop through which extends a bore coaxial with said bore in said casing,
   h. a guide member slidably mounted in said guideway and provided with internal screw threads, and
   i. rod extending through said coaxial bores in said casin and said stop, said rod being provided at one end with means for effecting rotation thereof and adjacent the other end with external screw threads having screw-threaded engagement with said internal screw threads in said guide member whereby rotation of said rod in one direction is effective to shift said guide member into engagement with said stop whereby continue rotation of said rod in said one direction is effective to shift said guide member, said cylindrical member and said brake-shoe-carrying brake head in the direction in which said brake head is moved away from the wheel of the vehicle to enable replacement of the brake shoe carried by said brake head.

29. A brake assembly, as recited in claim 28, further characterized in that rotation of said rod in a direction opposite said one direction upon cessation of rotation thereof in said one direction subsequent to said guide member engaging said stop is effective to shift said guide member in a direction away from said one stop, and by means for effecting shifting of said hollow cylindrical member and said brake-shoe-carrying brake head in the direction opposite one direction whereby shifting of said guide member in said direction away from said stop renders said means effective to shift said brake-shoe-carrying brake head in the direction of the wheel of the vehicle to decrease the clearance between the brake shoe and the tread surface of the wheel.

30. A brake assembly, as recited in claim 28, further characterized in that said guideway in said hollow cylindrical member is polygonal in cross section, and said guide member is polygonal in cross section.

31. A brake assembly, as recited in claim 27, further characterized in that said guideway in said hollow cylindrical member is square in cross section, and said guide member is square in cross section.

* * * * *

UNITED STATES PATENT AND TRADEMARK OFFICE
CERTIFICATE OF CORRECTION

PATENT NO. : 4,022,304
DATED : May 10, 1977
INVENTOR(S) : Willard P. Spalding

It is certified that error appears in the above-identified patent and that said Letters Patent are hereby corrected as shown below:

Column 19, line 56, before "one" insert --at--

Column 20, line 63, "about" should be --abut--

Column 21, line 16, "ther" should be --the-- line 67, "sid" should be --said--

Column 22, line 20, before "with" insert --member--

Column 24, line 5, before "rod" insert --a-- line 6, "casin" should be --casing-- line 13, "continue" should be --continued--

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*